US006986818B2

(12) United States Patent  
Tillotson et al.

(10) Patent No.: US 6,986,818 B2  
(45) Date of Patent: Jan. 17, 2006

(54) METHOD FOR PRODUCING NANOSTRUCTURED METAL-OXIDES

(75) Inventors: Thomas M. Tillotson, Tracy, CA (US); Randall L. Simpson, Livermore, CA (US); Lawrence W. Hrubesh, Pleasanton, CA (US); Alexander Gash, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 471 days.

(21) Appl. No.: 09/981,076

(22) Filed: Oct. 16, 2001

(65) Prior Publication Data

US 2002/0104599 A1   Aug. 8, 2002

Related U.S. Application Data

(62) Division of application No. 09/586,426, filed on Jun. 2, 2000, now abandoned.

(51) Int. Cl.  
*C06B 45/10* (2006.01)

(52) U.S. Cl. .............. 149/19.92; 524/431; 524/80

(58) Field of Classification Search ............. 524/431, 524/80; 149/19.92  
See application file for complete search history.

(56) References Cited

U.S. PATENT DOCUMENTS

| | | | | |
|---|---|---|---|---|
| 3,981,979 A | * | 9/1976 | Braithwaite et al. | 423/628 |
| 5,629,380 A | * | 5/1997 | Baldwin et al. | 525/113 |
| 5,698,483 A | * | 12/1997 | Ong et al. | 501/12 |
| 5,726,247 A | * | 3/1998 | Michalczyk et al. | 525/102 |
| 5,788,950 A | * | 8/1998 | Imamura et al. | 423/263 |
| 5,855,827 A | * | 1/1999 | Bussing et al. | 264/7 |
| 5,962,608 A | * | 10/1999 | Ryang et al. | 526/89 |
| 6,270,836 B1 | * | 8/2001 | Holman | 427/126.3 |
| 6,296,678 B1 | * | 10/2001 | Merzbacher et al. | 44/542 |
| 6,472,467 B1 | * | 10/2002 | Chiao | 524/755 |

* cited by examiner

*Primary Examiner*—David W. Wu  
*Assistant Examiner*—Henry S. Hu  
(74) *Attorney, Agent, or Firm*—John P. Woolridge; L.E. Carnahan; Alan H. Thompson

(57) ABSTRACT

A synthetic route for producing nanostructure metal-oxide-based materials using sol-gel processing. This procedure employs the use of stable and inexpensive hydrated-metal inorganic salts and environmentally friendly solvents such as water and ethanol. The synthesis involves the dissolution of the metal salt in a solvent followed by the addition of a proton scavenger, which induces gel formation in a timely manner. Both critical point (supercritical extraction) and atmospheric (low temperature evaporation) drying may be employed to produce monolithic aerogels and xerogels, respectively. Using this method synthesis of metal-oxide nanostructured materials have been carried out using inorganic salts, such as of $Fe^{3+}$, $Cr^{3+}$, $Al^{3+}$, $Ga^{3+}$, $In^{3+}$, $Hf^{4+}$, $Sn^{4+}$, $Zr^{4+}$, $Nb^{5+}$, $W^{6+}$, $Pr^{3+}$, $Er^{3+}$, $Nd^{3+}$, $Ce^{3+}$, $U^{3+}$ and $Y^{3+}$. The process is general and nanostructured metal-oxides from the following elements of the periodic table can be made: Groups 2 through 13, part of Group 14 (germanium, tin, lead), part of Group 15 (antimony, bismuth), part of Group 16 (polonium), and the lanthanides and actinides. The sol-gel processing allows for the addition of insoluble materials (e.g., metals or polymers) to the viscous sol, just before gelation, to produce a uniformly distributed nanocomposites upon gelation. As an example, energetic nanocomposites of $Fe_xO_y$ gel with distributed Al metal are readily made. The compositions are stable, safe, and can be readily ignited to thermitic reaction.

9 Claims, 2 Drawing Sheets

US 6,986,818 B2

METHOD FOR PRODUCING NANOSTRUCTURED METAL-OXIDES

This application is a division of Ser. No. 09/586,426 filed Jun. 2, 2000, now abandoned.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to a method of making nanostructured metal-oxides using sol-gel chemistry, particularly to using metal salt precursors.

A new synthesis approach to forming energetic materials, specifically pyrotechnics, explosives, and propellants, using the chemical sol-gel methodology is described and claimed in U.S. application Ser. No. 08/926,357 filed Sep. 9,1997 and now U.S. Pat. No. 6,666,935, entitled "Sol-Gel Manufactured Energetic Materials" and in International Application No. PCT/US98/18262 (WO 99/12870) published Mar. 18, 1999. In energetic composites we can control oxidizer-fuel balances at the nanometer scale.

Sol-gel chemistry involves the reactions of chemicals in solution to produce nanometer-sized primary particles, called "sols." The "sols" can be linked to form a three-dimensional solid network, called a "gel," with the remaining solution residing within open pores. Solution chemistry determines the resulting nanostructure and composition, which in turn determine the material properties. Controlled evaporation of the liquid phase results in a dense porous solid, "xerogel." Supercritical extraction (SCE) eliminates the surface tension and in so doing the capillary forces of the retreating liquid phase that collapse the pores. The results of SCE are highly porous, lightweight solids called "aerogels." A typical gel structure is characteristically very uniform because the particles and the pores between them are on the nanometer size scale. Such homogeneity ensures uniformity of the material properties, which is one of the key reasons for synthesizing energetic materials using the sol-gel methodology.

Nanocomposites are multicomponent materials in which at least one of the component phases has one or more dimensions (length, width, or thickness) in the nanometer size range, usually defined as 1 to 100 nm. Energetic nanocomposites are a class of materials that have a fuel component and an oxidizer component intimately mixed in which at least one of the component phases which meets the size definition. A sol-gel derived pyrotechnic is an example of an energetic nanocomposite, in which metal-oxide nanoparticles react with metals and other fuels in very exothermic reactions. The fuel resides within the pores of the solid matrix while the oxidizer comprises at least a portion of the skeletal matrix. Nanometer to millimeter size materials can be added to the matrix and processed to form a xerogel to achieve the desired performance properties. The sol-gel formulations, reported here, allow for intimate mixing of components at the nanoscale level and again have the potential for water processing. This sol-gel methodology can be used to make nanostructured energetic materials with potentially superior performance than existing formulations, and incorporate all the safety and low toxicity considerations of water or other environmentally acceptable processing solvent-based systems.

The present invention is a new general synthetic route for producing nanostructured metal-oxides which employs the use of stable and inexpensive metal salts and environmentally friendly solvents such as water and ethanol in which the salts are dissolved, followed by the addition of a proton scavenger which induces gelation, after which the gel is dried to form an aerogel or a xerogel. Also, insoluble metals and polymers can be added just prior to gelation for changing the characteristics of the material. By this method many metal-oxide nanostructured materials have been synthesized using numerous metal salts. The invention of making metal-oxide-based materials using sol-gel chemistry is applicable to oxides formed from the following elements of the periodic table: Groups 2 through 13, part of Group 14 (germanium, tin, lead), part of Group 15 (antimony, bismuth), part of Group 16 (polonium), and the lanthanides and actinides.

SUMMARY OF THE INVENTION

It is an object of the present invention to provide synthetically formed nanostructured metal-oxides.

A further object of the invention is to make nanostructured metal-oxides in an open container and at atmospheric temperature.

Another object of the invention is to provide a method for preparing metal-oxide skeletal structures from metal salts.

Another object of the invention is to provide a method of forming metal-oxide nanostructured solid skeletons using sol-gel processing and which includes the use of a proton scavenger to induce gelation.

Another object of the invention is to provide a sol-gel processing method for producing metal-oxides in which insoluble material can be added for changing the characteristics of the material.

Another object of the invention is to provide a method for producing aerogels and xerogel of metal-oxide-based materials.

Other objects and advantages of the present invention will become apparent from the following description and accompanying drawings. The invention involves a method for making nanostructured metal-oxide. The method can be carried out using an open container, such as a beaker, and at atmospheric temperature. The method employs the use of metal salts with solvents, such as water and ethanol, and involves the dissolution of the metal salt in the solvent followed by the addition of a proton scavenger (e.g., epoxides such as propylene oxide), which induces gel formation in a timely manner. Either critical point or atmospheric drying can be employed to produce monolithic aerogels or xerogels. For example, energetic nanocomposites consisting of a $Fe_xO_y$ gel structure with distributed aluminum metal are readily made. The compositions are stable, safe, and can be readily ignited to thermitic reaction.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves a method of making nanostructured metal-oxide materials using sol-gel chemistry. The invention is a new synthetic route for producing metal-oxide-based materials. This procedure employs the use of stable and inexpensive metal salts and environmentally friendly solvents such as water and ethanol. The synthesis is straightforward and involves the dissolution of the metal salt in a solvent (with water present) followed by addition of a proton scavenger (e.g., an epoxide), which induces gel formation in a timely manner. Experimental evidence shows that the proton scavenger irreversibly reacts with hydrogen from the hydrated-metal species which then undergo hydrolysis and condensation reactions to form a sol that undergoes further condensation to form a metal-oxide nanostructured gel. Both critical point and atmospheric drying have been employed to produce monolithic aerogels and xerogels, respectively. Using this method we have synthesized metal-oxide nanostructured materials starting with salts of Fe, Cr, Al, Ga, In, Hf, Sn, Zr, Mo, Ti, V, Co, Ni, Cu, Y, Ta, W, Pb, B, Nb, Ge, Pr, U, Ce, Er and Nd. The invention of making metal-oxide-based materials using sol-gel chemistry is applicable to oxides formed from the following elements of the periodic table: Groups 2 through 13, part of Group 14 (germanium, tin, lead), part of Group 15 (antimony, bismuth), part of Group 16 (polonium), and the lanthanides and actinides.

The materials have been characterized using optical and electron microscopy, infrared spectroscopy, surface area, pore size, and pore volume analyses. The ease of this synthetic approach along with the inexpensive, stable, and benign nature of the metal precursors and solvents allow for large-scale syntheses to be carried out.

The sol-gel technique allows for the addition of insoluble materials (e.g., metals, polymers, etc.) to the viscous sol, just before gelation, to produce a uniformly distributed and energetic nanocomposite upon gelation. As an example, energetic nanocomposites of $Fe_xO_y$ gel with distributed Al are readily made. The compositions are stable, safe, and can be readily ignited to thermitic reaction.

Figure 1:
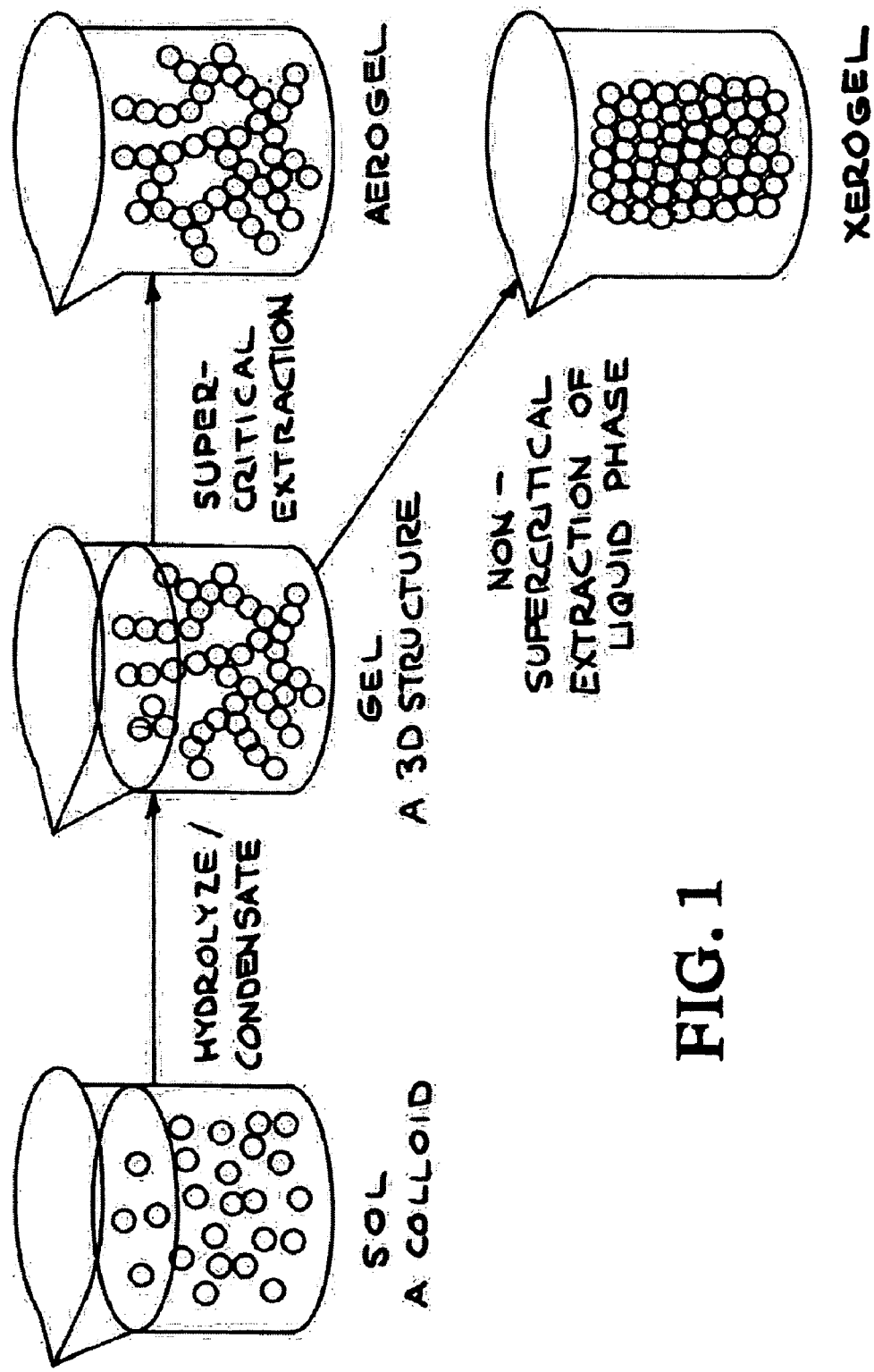
FIG. 1 illustrates the general process for sol-gel synthesis and processing.

The general process for sol-gel synthesis and processing is illustrated in FIG. 1. Monomers are reacted in solution to produce small nanometer size particles, a "sol," which cross-link to form a three-dimensional solid network with the remaining solution residing within open pores, a "gel." Controlled evaporation of the liquid phase in a gel results in a xerogel, while supercritical extraction eliminates the surface tension of the retreating liquid phase, producing highly porous solids, aerogels.

The invention is described hereinafter in two principle sections: 1) experimental section, and 2) results and discussion section, with each principle sections including subsections.

I. Experimental Section:

Preparation of $Fe_xO_y$ gels from Inorganic Fe(III) Salts: Ferric nitrate nonahydrate, $Fe(NO_3)_3.9H_2O$, ferric chloride hexahydrate, $FeCl_3.6H_2O$, ferric chloride, $FeCl_3$, and propylene oxide (99%) were used. Distilled water, 100% ethanol, and reagent grade methanol, 1-propanol, t-butanol, and acetone were also used. All syntheses were performed under room conditions of temperature and atmosphere. In a typical experiment, 0.65 g of $Fe(NO_3)_3.9H_2O$ (1.6 mmol) was dissolved in 2.5 mL of 100% ethanol to give a clear red/orange solution that remained unchanged upon storage for several months. If instead a 1.0 g portion of propylene oxide (17 mmol) was added to the solution there was rapid (~1 min.) formation of a deep dark red solution. This color change was accompanied by an exothermic release, as the vial became warm to the touch. This exothermic reaction was then followed by the formation of a monolithic dark red-brown transparent gel. The whole sequence of events (from epoxide addition to gelation) occurs within a time as short as 20 seconds to as long as six hours, depending on synthetic conditions.

Figure 2:
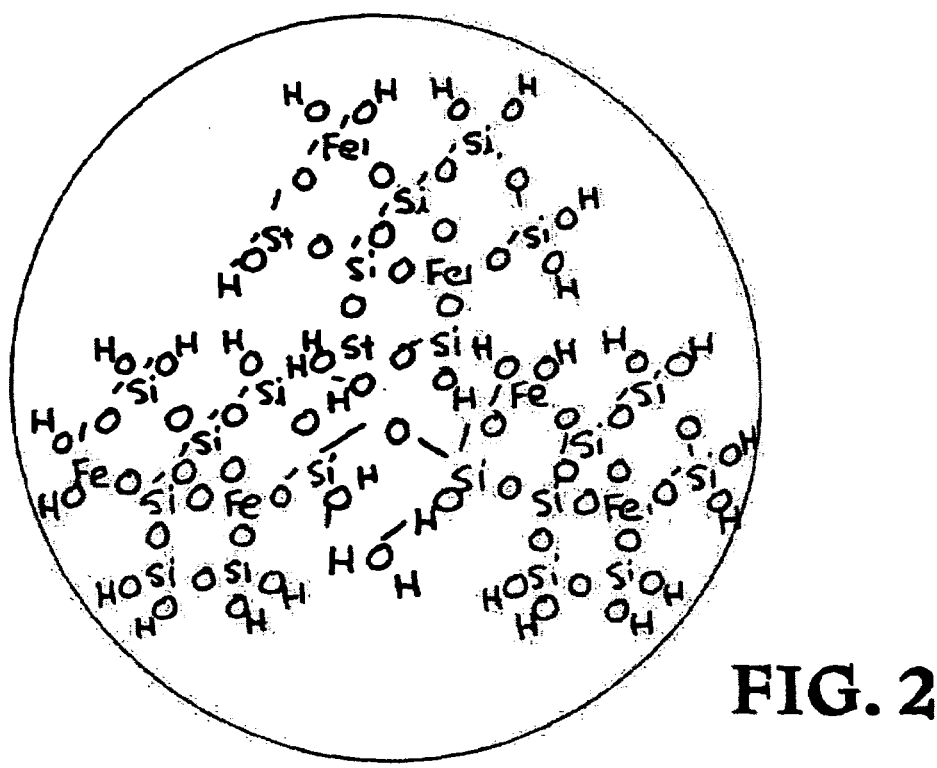
FIG. 2 is a molecular model for $Fe_xO_y$ made in accordance with the present invention.

It is instructive to note how we defined and determined both the gelation point and the $Fe_xO_y$ stoichiometry. All of the attempted syntheses were performed in glass vials so we could visually observe the flow of the reaction mixtures until the onset of gelation. We have qualitatively defined the gel point to be that at which the solution does not flow under the influence of gravity. We represent the stoichiometry of the iron-oxide gels as $Fe_xO_y$ because, as of now, we do not know the exact oxidation state(s) of the iron in the material. We believe that it is Fe(III), however, in the absence of rigorous oxidation state characterization, we feel it most prudent to represent the general stoichiometry as such. In addition, it is most probable that the iron-oxide gels contain significant amounts of both water and or hydroxyl groups. For simplicity, we have omitted recognizing these constituents with our abbreviated stoichiometry. We are determining the true iron oxidation state(s) and the stoichiometric amounts of $H_2O$ and hydroxyl groups in the material. A molecular model for the $Fe_xO_y$ is shown in FIG. 2.

Processing of $Fe_xO_y$ Gels: Aerogel samples were processed in a Polaron™ supercritical point drier. The solvent liquid in the pores of the wet gel was exchanged for $CO_2(l)$ for several days. Then the temperature of the vessel was ramped up to ~45° C., while maintaining a pressure of ~100 bars. The vessel was then depressurized at a rate of about 7 bars per hour. Xerogel samples were processed by allowing them to dry under room conditions.

Preparation of $Fe_xO_y/Al(s)$ pyrotechnic nanocomposites: To prepare a $Fe_xO_y/Al$ pyrotechnic nanocomposite, a stirred solution of Fe(III) salt was carefully monitored after the addition of propylene oxide. Just before gelation the viscosity of the solution increases rapidly. At the onset of the viscosity increase in the solution, a weighed portion of Al powder (diameter ~6 μm) was added to the stirring solution. The stirring allowed relatively uniform distribution of the Al in the metal-oxide matrix. The high viscosity of the solution prevented the Al(s) powder from settling to the bottom of the reaction vessel. Just prior to gelation the stir bar was removed from the slurry-like mixture. Samples prepared by this method were subjected to the same drying conditions as described above for processing to aerogels or to xerogel monoliths.

Physical Characterization of $Fe_xO_y$ aerogels and Xerogels: Infrared (IR) spectra were collected on pressed pellets containing KBr (IR-grade) and a small amount of solid sample. The spectra were collected with a Polaris™ Fourier transform spectrometer. Surface area and pore volume and size analyses were performed by BET methods using an ASAP 2000 Surface Area Analyzer (Micromeritics Instrument Corporation). Samples of approximately 0.1–0.2 g were heated to 200° C. under vacuum ($10^{-5}$ Torr) for at least 24 hours to remove all adsorbed species. Nitrogen adsorption data was taken at five relative pressures from 0.05 to 0.20 at 77K, to calculate the surface area by BET theory. The density of a dry gel was determined by measuring the dimensions of a monolithic cylindrical piece of it, calculating its volume, and then determining its mass on an analytical balance. High resolution transmission electron microscopy (HRTEM) was performed on a Philips CM300FEG operating at 300 KeV using zero loss energy filtering with a Gatan energy Imaging Filter (GIF) to remove inelastic scattering. The images where taken under bright field conditions and slightly defocused to increase contrast. The images were also recorded on a 2K×2K CCD camera attached to the GIF.

II. Results and Discussion:

Gel formation studies: Table 1 is a summary of the results from various synthetic attempts used to fabricate $Fe_xO_y$ gels. Examination of Table 1 reveals several synthetic combinations that resulted in the formation of strong, red-brown monolithic $Fe_xO_y$ gels. There are some interesting observations documented in Table 1 that warrant further discussion. For instance, $Fe_xO_y$ gels can be made using all three Fe(III) inorganic precursor salts used ($Fe(NO_3)_3.9H_2O$, $FeCl_3.6H_2O$, and $FeCl_3$). These salts are relatively inexpensive, easy to obtain, and can be stored under room conditions. In addition, all of the syntheses reported in Table 1 were performed under ambient conditions in simple and inexpensive glassware, such as beakers. It is also worthwhile to note that the $Fe_xO_y$ gels can be prepared in benign polar protic solvents such as water or alcohols. Some current large-scale pyrotechnic production requires the use of toxic, flammable, and carcinogenic solvents like acetone, hexane, and hexachlorobenzene. This aspect of the results could result in cleaner and safer large-scale pyrotechnic production.

TABLE 1

Summary of synthetic conditions for the synthesis of $Fe_xO_y$ gels.

| Precursor salt | Solvent | $H_2O$/Fe | Gel formation | $t_{gel}$ (minutes) |
|---|---|---|---|---|
| $Fe(NO_3)_3.9H_2O$ | water | 58 | no | — |
| $Fe(NO_3)_3.9H_2O$ | methanol | 9 | no | — |
| $Fe(NO_3)_3.9H_2O$ | ethanol | 9 | yes | 8 |
| $Fe(NO_3)_3.9H_2O$ | 1-propanol | 9 | yes | 3.5 |
| $Fe(NO_3)_3.9H_2O$ | t-butanol | 9 | yes | 2 |
| $FeCl_3.6H_2O$ | water | 55 | yes | 3 |
| $FeCl_3.6H_2O$ | acetone | 6 | yes | —[a] |
| $FeCl_3.6H_2O$ | methanol | 6 | yes | 23 |
| $FeCl_3.6H_2O$ | methanol | 9 | yes | 6.5 |
| $FeCl_3.6H_2O$ | ethanol | 6 | yes | 25 |
| $FeCl_3.6H_2O$ | ethanol | 9 | yes | 10 |
| $FeCl_3.6H_2O$ | 1-propanol | 6 | yes | 60 |
| $FeCl_3.6H_2O$ | 1-propanol | 9 | yes | 6 |
| $FeCl_3.6H_2O$ | t-butanol | 6 | no | —[b] |
| $FeCl_3$ | water | 49 | yes | 2 |
| $FeCl_3$ | ethanol | 0 | no | — |
| $FeCl_3$ | ethanol | 9 | yes | 5 |

[a]Dissolution of $Fe(NO_3)_3.9H_2O$ in acetone is rapidly followed by precipitation of a yellow/brown solid.
[b]In this case a brown precipitate was formed after addition of the propylene oxide.

Further inspection of Table 1 shows that water (present as either waters of hydration of the respective precursor salt or as the solvent) was a necessary component in all of the successful syntheses. Attempted syntheses of $Fe_xO_y$ gel from $FeCl_3$ in anhydrous ethanol resulted in indefinitely stable clear yellow/orange solutions. In a series of separate experiments, several portions of $FeCl_3$ were dissolved in ethanol and to each solution various amounts of water were added. Identical amounts of propylene oxide were added to each mixture and the solutions were monitored for gel formation. $Fe_xO_y$ gel formation was observed in all of the vials where the mole ratio of $H_2O$/Fe was greater than 4. However, the solutions where the Fe/$H_2O \leq 4$ were stable indefinitely. Some hydrolysis and condensation of Fe(III) had occurred in these solutions as they were dark red in color (characteristic color of oligomeric Fe (III)-oxide species). However, the degree of hydrolysis was not sufficient to bring about gel formation.

According to Table 1, the rate of gel formation appears to be faster for gels formed in alcoholic solvents (specifically ethanol and 1-propanol) using the $Fe(NO_3)_3.9H_2O$, precursor as opposed to the $FeCl_3.6H_2O$ salt. We believe that the difference in rates is due to the fact that there is more water (9 equivalents) present when the nitrate salt is used than when the hydrated chloride salt (6 equivalents) is used. To test this hypothesis we performed syntheses with the hydrated chloride salt in ethanol and 1-propanol where an additional 3 equivalents of water was added to each mixture (this raised the total number of water equivalents to 9). In both cases, the gel formation was significantly faster than when only 6 equivalents of water were present. The addition of water to the syntheses in ethanol and 1-propanol resulted in gel times of 10 and 6 minutes, respectively. These numbers are essentially identical to those observed using the $Fe(NO_3)_3.9H_2O$ precursor in those same solvents. Therefore, it appears that in alcoholic solvents the counterion does not appreciably affect the rate of gelation. However, the amount of water present does appear to affect the rate of gelation. This observation is not without precedence, as the rate of $SiO_2$ gel formation from silicon alkoxide precursors in alcoholic solvents has been shown to increase with increasing $H_2O$/Si ratio.

Another synthetic parameter that was extensively investigated was the ratio of propylene oxide to Fe(III), denoted as Q. Several experiments were run where Q was varied from 3–25 the results of which are shown in Table 2. One can see here that the rate of gel formation increases with Q. The dependence appears to be asymptotic, as there is relatively little difference (approximately a factor of 2) in the rate of gelation for synthesis where Q is 11 and 23 respectively. However, the difference in between the rate of gelation for the two syntheses is 7 and 6.0 respectively is a factor of 1800. The data in Table 2 also indicate that there is a critical Q ratio below which no gel formation is observed, even after several months. That value is 6 for the synthetic conditions described in Table 2.

TABLE 2

Summary of the effect of propylene oxide/Fe mole ratio on the gel formation of $Fe_xO_y$ gels made in ethanol from the precursor salt $Fe(NO_3)_3.9H_2O$ ([Fe] = 0.37M).

| Q Ratio: propylene oxide/Fe | Gel formation | Gel time (minutes) |
|---|---|---|
| 3.4 | no | — |
| 5.0 | no | — |
| 6.0 | yes | ~7200 |
| 6.2 | yes | ~6000 |
| 7.0 | yes | 4.0 |
| 8.0 | yes | 2.5 |
| 8.6 | yes | 2.5 |
| 9.8 | yes | 2.0 |
| 11 | yes | 1.2 |
| 17 | yes | 0.90 |
| 21 | yes | 0.75 |
| 23 | yes | 0.63 |

Some of the $Fe_xO_y$ gels described in Table 1 were dried under atmospheric conditions or supercritical conditions with $CO_2$(l) to produce xerogel and aerogel monoliths, respectively. Photos of monolithic $Fe_xO_y$ aerogel and xerogel samples have been made. These photos indicate that monolithic $Fe_xO_y$ aerogels and xerogels can be formed. Previous reports of sol-gel syntheses often resulted in the formation of powders of iron (III) oxide. Here we demonstrate our ability to make monolithic porous iron (III) oxide using this synthetic approach. The importance of this particular aspect of our account cannot be understated. It allows the synthesis and shape casting of nanostructured porous iron-oxide materials, as well as those of pyrotechnic compositions, to make monolithic materials in a variety of shapes and sizes. This might eliminate the need for time-consuming, expensive, and potentially dangerous pressing and machining of the solids to make materials with precise sizes, densities, and geometries.

Morphology of $Fe_xO_y$ Gels: We utilized high-resolution transmission electron microscopy (HRTEM) to examine the morphology of $Fe_xO_y$ aerogels. Micrographs of a $Fe_xO_y$ aerogel, not shown, have been made. Qualitatively, the material appears to be a collection of clusters that contain cavities of mesoporous (20–50 nm) dimensions. The micrographs provide a fine representation of the size, shape, and connectivity of the $FE_xO_y$ clusters that make up the aerogel. These clusters are relatively uniform spheres with most having diameters in the 5–10 nm range. Notwithstanding, these results clearly show that $Fe_xO_y$ made by the epoxide-addition method is made up of nanometer-sized clusters. The observed $Fe_xO_y$ aerogel microstructure is consistent with the generic sol-gel mechanism for gel formation. According to that mechanism, the initial monomer (hydrated Fe(III) species in this case) polymerizes to form small particles (polymerization is probably due to the condensation of hydrated Fe(III) monomers). These oligomers then undergo further growth until they begin to link together into clusters. These particles eventually link together to form an extended network throughout the medium that then rapidly thickens to form a gel.

Synthesis of Energetic Nanocomposites: This sol-gel method allows for the addition of insoluble materials (e.g., metals, polymers, etc.) to the viscous sol, just before gelation, to produce a uniformly distributed and energetic nanocomposite upon gelation. Al metal (as a fine powder 6 $\mu$m in diameter) was added to some $Fe_xO_y$ gel syntheses just before gelation to produce $Fe_xO_y$/Al pyrotechnic nanocomposites. These nanocomposites were subsequently processed to make both a xerogel and aerogel of the material. Using an optical microscope on the $Fe_xO_y$/Al aerogels one can see the small shiny spheres of Al (6 $\mu$m) uniformly dispersed throughout the $Fe_xO_y$ nanostructured matrix. The energetic nanocomposites can be ignited using a propane torch. This same process can be used for distributing solid particles from nanometers to millimeters and particle densities from low to high within the gel matrix.

The nature of the wet nanocomposites also affords an additional degree of safety. The wet pyrotechnic nanocomposites cannot be ignited until the drying process is complete. This property should allow the production of a large quantity of the pyrotechnics that can be stored safely for some time and dried shortly before its use.

The sol-gel approach also allows the relatively simple incorporation of other metal-oxides into the $Fe_xO_y$ matrix to make a mixed-metal-oxide material. Different metal-oxide precursors can be easily mixed into the Fe(III) solution, before the addition of the epoxide. Dilution of the thermitic material with inert oxides such as $Al_2O_3$ (from dissolved $AlCl_3$ salt) or $SiO_2$ (from added silicon alkoxide) leads to a pyrotechnic material that is not as energetic as a pure iron(III)-oxide-aluminum mixture. We have performed such syntheses. Qualitatively, the resulting pyrotechnics have noticeably slower burn rates and are less energetic. Alternatively, one could add metal-oxide components that are more reactive with Al to increase the energy released. Finally, this would also permit the addition of metal-oxide constituent(s) that provide a desired spectral emission to the energetic nanocomposite. This type of synthetic control should allow the chemist to tailor the pyrotechnic's burn and spectral properties to fit a desired application.

Figure 3:
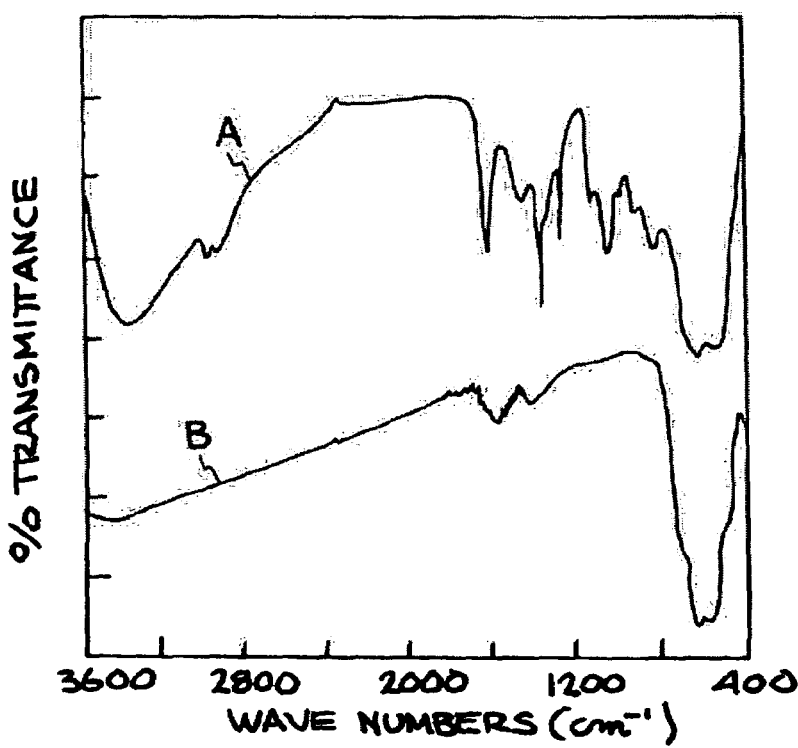
FIG. 3 is an overlay of the Fourier transform IR spectra of an $Fe_xO_y$ aerogel (A) and its vacuum dried (200° C.) product (B).

FTIR characterization of Fe-based gels: FIG. 3 is an overlay of the Fourier transform IR spectra of the $Fe_xO_y$ aerogel and its vacuum dried (200° C.) product. The spectrum of the $Fe_xO_y$ aerogel (line A) contains many absorptions. The intense and broad absorption in the 3200–3600 cm$^{-1}$ region likely corresponds to v(O—H) stretching vibrations of adsorbed water (sample was synthesized, stored, and FTIR spectrum was taken under room conditions) and O—H moieties present in the solid. In addition, the absorption at ~1630 cm$^{-1}$ is likely due to the bending mode of water $\delta(H_2O)$. The presence of O—H groups in the IR of $Fe_xO_y$ synthesized by solution methods is very common. The absorptions present at 2800–3000 cm$^{-1}$ are due to v(C—H) vibrations. These, as well as the absorptions present from 1400–800 cm$^{-1}$, are probably due to the ethanol solvent used, residual propylene oxide, or side products of the ring opening of the propylene oxide. The absorptions between 700 cm$^{-1}$ and 500 cm$^{-1}$ are those from the Fe—O linkages that make up the framework of the aerogel. All of the phases of iron oxides and oxyhydroxides have characteristic IR vibrations in this region. The assignment of the spectrum shown in line A of FIG. 3 to one particular phase of iron oxide is not straightforward. Notwithstanding, with the FTIR evidence shown here we tentatively conclude that the non-heat-treated $Fe_xO_y$ aerogel material is probably an iron oxyhydroxide phase. We intend to further pursue the identification of the $Fe_xO_y$ phase(s) present in this material through the use of powder x-ray diffraction (PXRD) and x-ray absorption fine structure spectroscopy (XAFS).

The spectrum shown in line B of FIG. 3 is that of the $Fe_xO_y$ aerogel that has been heated to 200° C. under a dynamic vacuum. This heat treatment results in a mass loss of ~30% of the material. There are three notable differences between this spectrum and that of the $Fe_xO_y$ aerogel. First, the absorption in the 3200–3600 cm$^{-1}$ region of the spectrum is much less intense in the heat-treated sample. This is most likely due to the removal of a large percentage of the O—H moieties present in the original aerogel through condensation of two neighboring OH groups to give a single oxygen bridge. Second, there is no trace of the absorptions assigned to C—H bonds present in the heat-treated sample. These organic constituents have also been removed in the heating process. Finally, the two intense absorptions at 510 and 615 cm$^{-1}$ in the original aerogel have shifted and split into three peaks at 565, 585, and 630 cm$^{-1}$ respectively. The location of the IR bands present in the heat-treated sample match very well to those reported for maghemite, the $\gamma$-phase of $Fe_2O_3$. It is worthwhile to note that maghemite is magnetic and that the heat-treated material in line B of FIG. 3 is also magnetic.

Table 3 summarizes the surface areas, pore volumes, and average pore sizes for several $Fe_xO_y$ aerogels and xerogels. In general, all of the materials listed in Table 3 have high surface areas and pore diameters whose dimensions are in the micro to small mesoporic (2–20 nm) region. One will note that the xerogeled solid has a comparable total surface area to the aerogel material made under identical conditions.

However, the pore volume and average pore diameter of the xerogel sample are significantly smaller than that of the aerogel sample (0.22 mL/g and 2.6 nm compared to 1.25 mL/g and 12 nm respectively). This is expected as the evaporation of the ethanol from the xerogel sample exerted substantial capillary forces on the gel's pore structure, which resulted in significant shrinkage of the pores, relative to the aerogel sample.

TABLE 3

Summary of properties of $Fe_xO_y$ aerogels and xerogels.

| Gel type[a] | Precursor salt | Solvent | Surface area ($m^2$/g) | Pore volume (mL/g) | Average pore diameter (nm) |
|---|---|---|---|---|---|
| Xero (200) | $Fe(NO_3)_3 \cdot 9H_2O$ | ethanol | 300 | 0.2 | 2.6 |
| Aero (100) | $Fe(NO_3)_3 \cdot 9H_2O$ | ethanol | 490 | 1.5 | 11 |
| Aero (200) | $Fe(NO_3)_3 \cdot 9H_2O$ | ethanol | 340 | 1.3 | 12 |
| Aero (300) | $Fe(NO_3)_3 \cdot 9H_2O$ | ethanol | 190 | 1.0 | 19 |
| Aero (200) | $Fe(NO_3)_3 \cdot 9H_2O$ | 1-propanol | 350 | 1.4 | 12 |
| Aero (200) | $FeCl_3 \cdot 6H_2O$ | water | 370 | 2.9 | 15 |
| Aero (200) | $FeCl_3 \cdot 6H_2O$ | methanol | 300 | 2.4 | 23 |
| Aero (200) | $FeCl_3 \cdot 6H_2O$ | ethanol | 390 | 3.8 | 23 |

[a]The number in parentheses is the temperature in degrees Celsius that each respective gel was heated to under a dynamic vacuum to ensure removal of all adsorbed species before surface area analyses.
[b]This sample was prepared by the delayed addition method.

Several $Fe_xO_y$ gels were heat treated at three different temperatures prior to analyses (100, 200, and 300° C.). As a result all three aerogels have notably distinct microstructural properties. The surface areas, and pore volumes decrease while the pore diameters increase with increasing drying temperature. This has been previously noted in studies of other metal-oxide aerogels. The reasoning for these observations is as follows. According to the FTIR analyses there are many hydroxyl groups present in these materials. Certainly, many of the hydroxyls are surface bound and therefore, heating induces the condensation of the hydroxyl groups. This process has the effect of pulling together the small particles that make up the microstructure of the gel. As a result, these materials have reduced surface areas and pore volumes as well as enlarged pore sizes. Evidently, the extent of this process is more pronounced with increasing heating temperatures.

The aerogel made from the $FeCl_3 \cdot 6H_2O$ precursor has a considerably larger surface area, pore volume, and pore diameter than that made from the $Fe(NO_3)_3 \cdot 9H_2O$ precursor. Moreover, the surface area, pore volume, and pore diameter of the aerogel made from the nitrate precursor by the delayed addition method are all significantly larger than those for the aerogel made by the one-step addition method. The reasons for these observations are not completely understood at this time. Regardless, these results suggest that the surface areas and pore characteristics of the $Fe_xO_y$ gels can be significantly altered by the choice of solvent, Fe(III) precursor, drying method, and post-synthesis heat treatment.

The following is a generalized example of the procedure or operational steps for carrying out the method of the present invention and in addition for the addition of insoluble materials (e.g., metal, polymers, etc.) which change the physical and chemical composition of the thus produced xerogel or aerogel. The method of the present invention as shown in the following example, is carried out via operations or steps 1–4 and 6, with the same method by the addition of operation 5 produces a metal-oxide energetic material, such as $Fe_xO_y$/Al described above. As seen in the following example, drying may be carried out by supercritical extraction (SCE) to produce an aerogel, or by low temperature evaporation to produce an aerogel.

1. Weigh solution
   1.0 gms $Fe(NO_3)_3 \cdot 9H_2O$
   5.0 gms EtOH (200 proof)
2. Dissolve with mixing
3. Add 2.0 gms propylene oxide (PO)*
4. Stir
5. Add Aluminum just prior to gelation (~5 min. gel time)
   *teflon or gas generators
6. Dry
   A) SCE
   B) Xerogel     A) SCE     (both cases)
                  B) Xerogel

*concentration of PO determines gel time

In addition to metals, such as aluminum powder, other ingredients may be added just prior to gelation, which include organic constituents for binders or gas generators during reactions, burn rate modifiers, or spectral emitters, as discussed above.

Proton Scavengers: The sol-gel chemistry is general in nature. Table 4 lists different epoxide proton scavengers used successfully with $Fe_xO_y$. It also shows that the rate of gelation can be dramatically altered by the choice of a more or less reactive epoxide. We have demonstrated that these epoxides can induce gelation of dissolved metal salts consisting of cations of the periodic chart elements in the main-group, the transition metals, the lanthanides, and the actinides.

TABLE 4

Summary of gel times for $Fe_xO_y$ gels made with different epoxide proton scavengers. Conditions of syntheses: ethanol (solvent), precursor salt ($Fe(NO_3)_3 \cdot 9H_2O$), [Fe] = 0.37 M, epoxide/Fe = 11.

| Epoxide | $t_{gel}$ (minutes) |
|---|---|
| butadiene monoxide | 0.33 |
| cyclohexene oxide | 0.45 |
| cis-2,3-epoxybutane | 0.72 |
| propylene oxide | 1.5 |
| 1,2-epoxybutane | 2.5 |
| 1,2-epoxypentane | 4.8 |
| 2,3 epoxy(propyl)benzene | 27 |
| glycidol | 62 |
| epichlorohydrin | 85 |
| epifluorohydrin | 82 |
| epibromohydrin | 109 |
| trimethylene oxide | 320 |

Solvents: Table 5 lists different solvent used successfully with $Fe_xO_y$. Most of these solvents work in the syntheses of other metal-oxides.

TABLE 5

Summary of synthetic conditions for the synthesis of $Fe_xO_y$ gels from $FeCl_3.6H_2O$ precursor ([Fe] = 0.35 M).

| solvent | $H_2O$/Fe | gel formation | $t_{gel}$ |
|---|---|---|---|
| water | 55 | yes | 3 min. |
| methanol | 6 | yes | 23 min. |
| ethanol | 6 | yes | 25 min. |
| 1-propanol | 6 | yes | 60 min. |
| t-butanol | 6 | yes | Not recorded |
| dimethylformamide | 6 | yes | <12 hr. |
| acetone | 6 | yes | Not recorded |
| ethylene glycol | 6 | yes | <12 hr. |
| propylene glycol | 6 | yes | <12 hr. |
| formamide | 6 | yes | <3 hr. |
| benzyl alcohol | 6 | yes | ~40 days |

Influence of Added Nucleophiles: Table 6 demonstrates that the identity of the counterion used in the precursor metal salt is irrelevant. If a suitable nucleophile (e.g., chloride, bromide, etc.) is added, gel formation will be induced no matter what the identity of the salt is (i.e., organic, inorganic). This is significant because it extends our method to essentially all salts of each respective metal ion for which we can make the corresponding metal-oxide. We have shown this to be a general method (nucleophilic addition) that induces gelation in many dissolved metal salts.

TABLE 6

Aqueous syntheses of $Fe_xO_y$ gels by added-nucleophile method.

| Gel | precursor Salt | added nucleophile[a] | gel formation | $t_{gel}$ (minutes) |
|---|---|---|---|---|
| $Fe_xO_y$ | $Fe(NO_3)_3.9H_2O$ | — | no | — |
| $Fe_xO_y$ | $FeCl_3.6H_2O$ | — | yes | — |
| $Fe_xO_y$ | $Fe(NO_3)_3.9H_2O$ | $Cl^-$ | yes | 2 |
| $Fe_xO_y$ | $Fe(NO_3)_3.9H_2O$ | $Br^-$ | yes | 3 |
| $Fe_xO_y$ | $Fe(NO_3)_3.9H_2O$ | $CH_3CO_2^-$ | yes | <8 hrs. |

[a]Sodium salt was used for chloride, bromide, and acetate nucleophiles.

General Applicable to Metal Salts: While the above detailed description has been directed to the production of $Fe_xO_y$ aerogels or xerogels, by the use of the method of this invention we have also synthesized a myriad of metal-oxide nanostructured materials. Table 7 lists some of the metal-oxides made. The invention of making metal-oxide-based materials using this process is applicable to oxides formed from the following elements of the periodic table: Groups 2 through 13, part of Group 14 (germanium, tin, lead), part of Group 15 (antimony, bismuth), part of Group 16 (polonium), and the lanthanides and actinides.

TABLE 7

Some other nanostructured metal-oxides made by the process

| Metal Ion | Precursor Salt | $H_2O$/M | gel formation | Product |
|---|---|---|---|---|
| $Fe^{3+}$ | $Fe(NO_3)_3.9H_2O$ | 9 | yes | $Fe_2O_3$ |
| $Cr^{3+}$ | $Cr(NO_3)_3.9H_2O$ | 9 | yes | $Cr_2O_3$ |
| $Al^{3+}$ | $Al(NO_3)_3.9H_2O$ | 9 | yes | $Al_2O_3$ |
| $In^{3+}$ | $In(NO_3)_3.5H_2O$ | 5 | yes | $In_2O_3$ |
| $Ga^{3+}$ | $Ga(NO_3)_3.xH_2O$ | x | yes | $Ga_2O_3$ |
| $Sn^{4+}$ | $SnCl_4.5H_2O$ | 9 | yes | $SnO_2$ |
| $Hf^{4+}$ | $HfCl_4$ | 9 | yes | $HfO_2$ |
| $Zr^{4+}$ | $ZrCl_4$ | 9 | yes | $ZrO_2$ |
| $Nb^{5+}$ | $NbCl_5$ | 6 | yes | $Nb_2O_5$ |
| $W^{6+}$ | $WCl_6$ | 6 | yes | $WO_3$ |
| $Y^{3+}$ | $Y(NO_3)_3.6H_2O$ | 6 | yes | $Y_2O_3$ |
| $Pr^{3+}$ | $Pr(NO_3)_3.6H_2O$ | 6 | yes | $Pr_2O_3$ |
| $U^{6+}$ | $UO_2(NO_3)_2.9H_2O$ | 9 | yes | $UO_3$ |

Significant application of nanostructured metal-oxides: We have utilized sol-gel chemistry to produce energetic nanocomposites of the general metal-oxide metal composition formula $(M_1)_xO_y/M_2$. When ignited there is rapid exchange of the oxygen between metals with significant energy release. The sol-gel method is a safe, inexpensive, convenient, and flexible route to synthesis of these types of energetic nanocomposites. It is a suitable method to control the composition, morphology, and density of the final material, all of which can affect the energetic and performance properties of the resulting pyrotechnic.

SUMMARY

While various embodiments, materials, parameters, etc., along with operation sequences have been described and/or illustrated to exemplify and explain the principles of the invention, such are not intended to be limited. Modifications and changes may become apparent to those skilled in the art, and it is intended that the invention be limited only by the scope of the appended claims.

What is claimed is:

1. A sol-gel process for producing an inorganic monolithic nanostructured metal-oxide aerogel or an inorganic monolithic nanostructured metal-oxide xerogel, comprising:
    dissolving a metal salt in a solvent at least containing water to produce a solution;
    inducing sol formation;
    adding a proton scavenger to induce and control gelation for producing an inorganic gel;
    providing sufficient time for formation of said inorganic gel; and
    drying said inorganic gel to produce an inorganic monolithic nanostructured metal-oxide aerogel or an inorganic monolithic nanostructured metal-oxide xerogel.

2. The sol-gel process of claim 1, wherein the step of drying is carried out by one of supercritical extraction to produce said inorganic monolithic metal-oxide aerogel or by evaporation to produce said inorganic monolithic metal-oxide xerogel.

3. The sol-gel process of claim 1, additionally including washing said inorganic gel prior to the step of drying said inorganic gel.

4. The sol-gel process of claim 1, additionally including aging said inorganic gel prior to the step of drying, wherein the step of aging is for increasing strength of said inorganic gel and enabling easier drying of said inorganic gel.

5. The sol-gel process of claim 1, additionally including the step of forming metal-oxide particles from said inorganic monolithic nanostructured metal-oxide aerogel or said inorganic monolithic nanostructured metal-oxide xerogel.

6. The sol-gel process of claim 1, wherein said salt is selected from the group of inorganic salts consisting of $Fe^{3+}$, $Cr^{3+}$, $Al^{3+}$, $Ga^{3+}$, $In^{3+}$, $Hf^{4+}$, $Sn^{4+}$, $Zr^{4+}$, $Nb^{5+}$, $W^{6+}$, $Pr^{3+}$, $Er^{3+}$, $Nd^{3+}$, $U^{3+}$, and $Y^{3+}$.

7. The sol-gel process of claim 1, wherein said inorganic monolithic nanostructured metal-oxide aerogel and said inorganic monolithic nanostructured metal-oxide xerogel contains materials selected from the group consisting of $Fe_xO_y$, $Cr_2O_3$, and $Al_2O_3$.

8. The sol-gel process of claim 1, wherein said metal salt is selected from the group consisting of $Fe(NO_3)_3 \cdot 9H_2O$, $FeCl_3 \cdot 6H_2O$, and $FeCl_3$, and wherein the gel formation is composed of $Fe_xO_y$.

9. The sol-gel process of claim 1, wherein said proton scavenger contains oxacyclo-alkane.

* * * * *